United States Patent [19]

Ishikawa

[11] Patent Number: 5,748,460
[45] Date of Patent: May 5, 1998

[54] POWER SUPPLY APPARATUS

[75] Inventor: Tadashi Ishikawa, Tokyo, Japan

[73] Assignee: Canon Kabushiki Kaisha, Tokyo, Japan

[21] Appl. No.: 798,626

[22] Filed: Feb. 11, 1997

Related U.S. Application Data

[63] Continuation of Ser. No. 581,204, Dec. 29, 1995, Pat. No. 5,612,857.

[30] Foreign Application Priority Data

Jan. 11, 1995 [JP] Japan ......................... 7-2691

[51] Int. Cl.$^6$ ..................................... G06F 1/26
[52] U.S. Cl. ........................................... 363/21
[58] Field of Search ................ 395/750; 364/273, 364/948.91, DIG. 2, 707; 363/20-21

[56] References Cited

U.S. PATENT DOCUMENTS 5,414,862  5/1995  Suzuki et al. .................. 395/750

*Primary Examiner*—Aditya Krishnan
*Attorney, Agent, or Firm*—Fitzpatrick, Cella, Harper & Scinto

[57] ABSTRACT

In a power supply apparatus which is used for an image forming apparatus, even when a resonance frequency extremely changes due to an influence by an inductance load just after a fluorescent lamp was lit on and after completion of the stabilization after the light-on, the apparatus can immediately follow such a change and can generate a stable voltage. The apparatus is constructed by a comparator for comparing an output value of a secondary winding of a transformer and a predetermined value, first and second U/D counters in which counting up/down (U/D) operations can be switched by an output of the comparator, a selector for selecting outputs of the counters, a synchronous detecting circuit for generating a sync pulse in accordance with an output of another primary winding of the transformer, a down counter for loading the output of the U/D counter selected by the selector at a timing of the sync pulse, and a control circuit constructed by first and second digital comparators for comparing an output of the down counter and predetermined values X and W. A driver decides a conducting timing of a switching device of a driving winding on the primary side of the transformer in accordance with an output of the comparator. The selector determines the U/D counter to be selected in accordance with an output of the comparator.

6 Claims, 2 Drawing Sheets

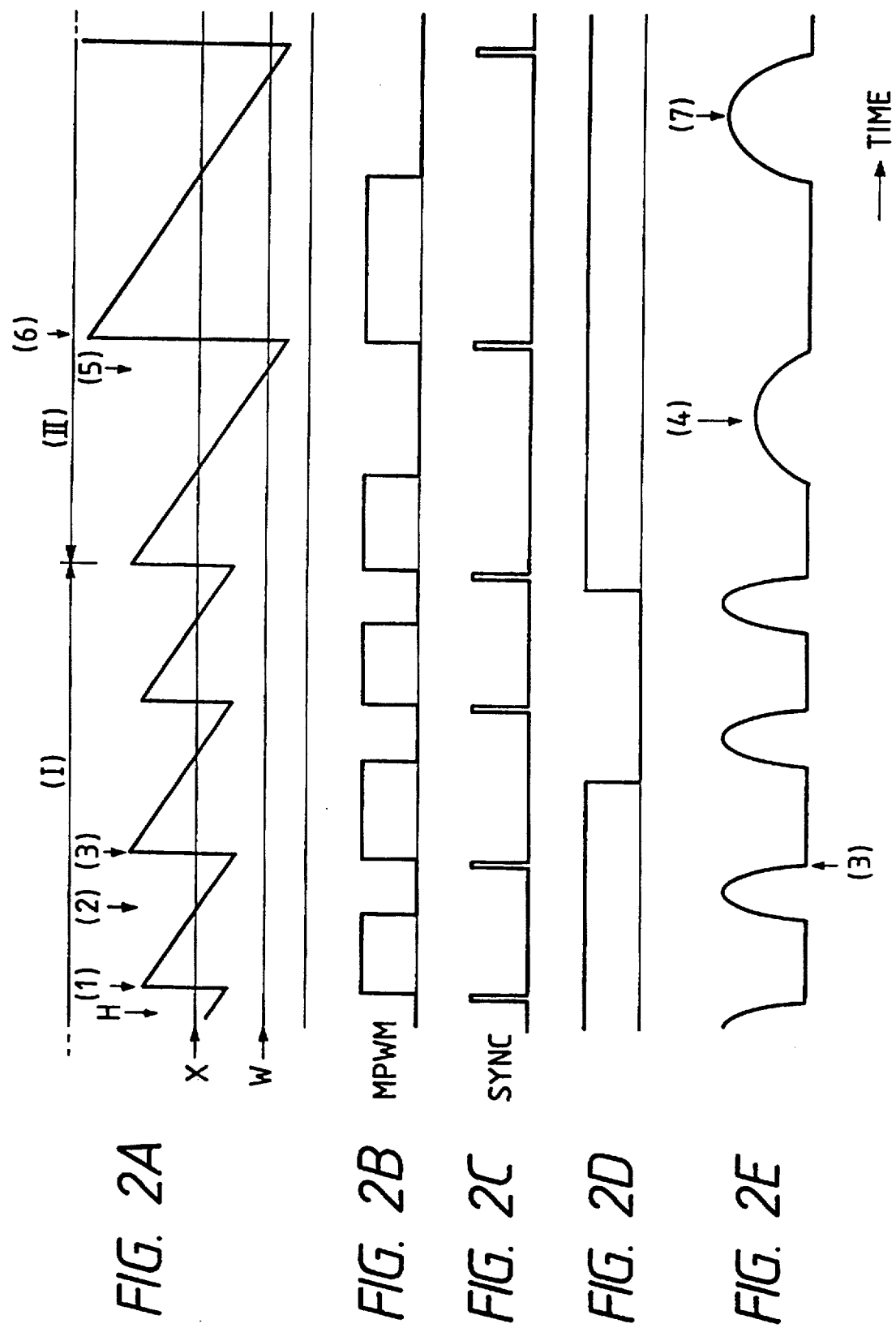

POWER SUPPLY APPARATUS

This application is a continuation of application Ser. No. 08/581,204 filed Dec. 29, 1995 now U.S. Pat. No. 5,612,857.

BACKGROUND OF THE INVENTION

1. Field of the Invention

The present invention relates to a power supply apparatus and, more particularly, to a power supply apparatus which is applied to an image forming apparatus such as copying apparatus, printer, or the like.

2. Related background Art

Hitherto, in a voltage resonance type switching power supply apparatus which is generally used as such a kind of power supply apparatus, it is a point on designing that a resonance waveform on the primary side is stabilized and is certainly zero-cross switched.

In the above conventional power supply apparatus, however, when an L (impedance) load exists, a resonance frequency extremely changes due to its influence. Hitherto, there is a problem such that a control is not transiently stabilized or a response speed is slow in accordance with such an extreme change.

SUMMARY OF THE INVENTION

It is an object of the invention to provide a power supply apparatus in which the foregoing drawbacks are eliminated.

Another object of the invention is to provide a power supply apparatus in which even when a resonance waveform extremely changes by an L load, it can be controlled so as to follow such a change at a high response speed.

The above and other objects and features of the present invention will become apparent from the following detailed description and the appended claims with reference to the accompanying drawings.

BRIEF DESCRIPTION OF THE DRAWINGS

FIGS. 2A to 2E are timing charts showing the operation of a control apparatus in the embodiment.

DETAILED DESCRIPTION OF THE PREFERRED EMBODIMENT

Figure 1:
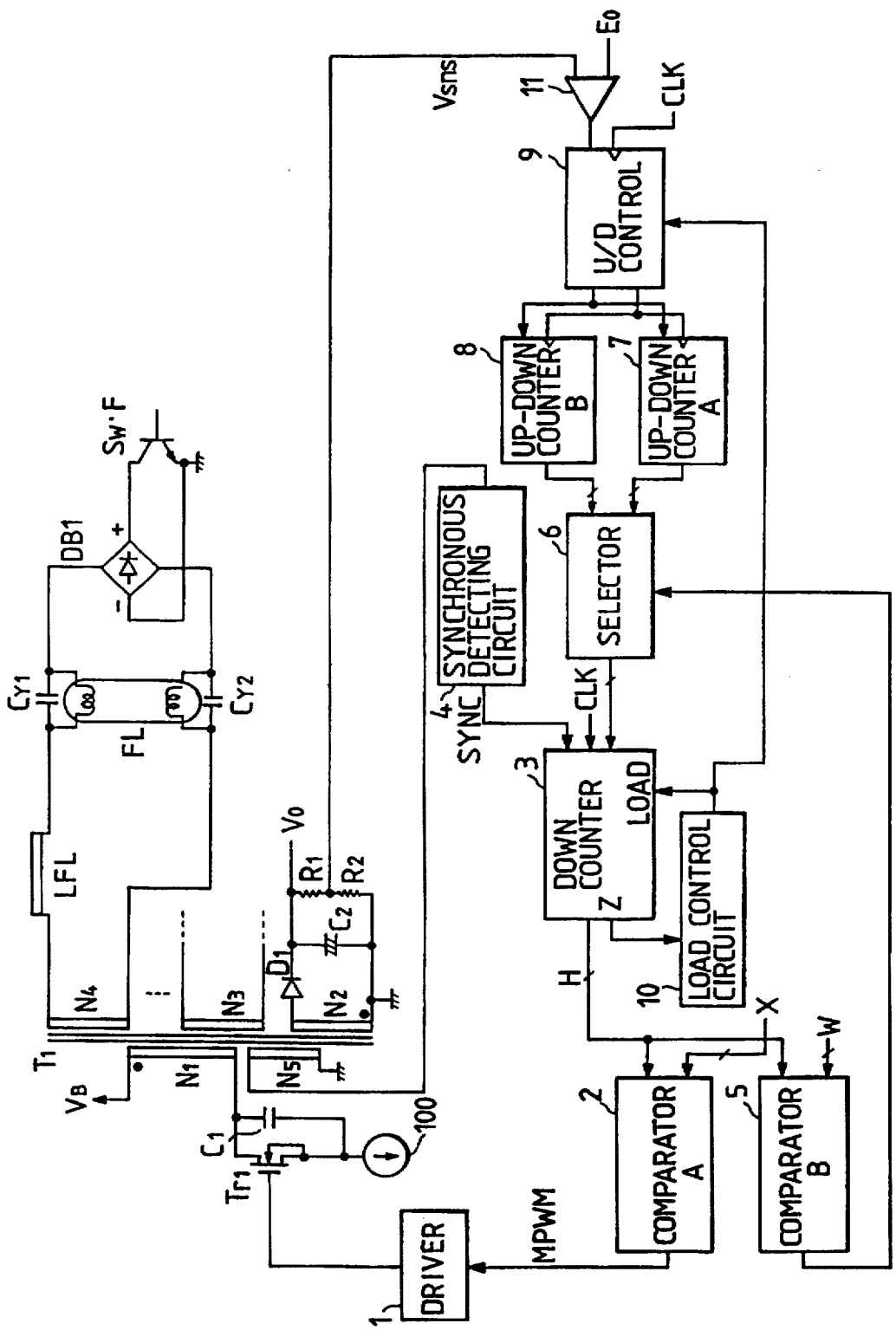
FIG. 1 is a block diagram showing a construction of a power supply apparatus of an embodiment of the invention.

An embodiment of the invention will now be described in detail hereinbelow with reference to the drawings.

FIG. 1 shows a construction of a power supply apparatus in the embodiment of the invention. In FIG. 1, an output on the plus (+) side obtained by rectifying and smoothing an AC (alternating current) line input by a rectifying and smoothing circuit (not shown) is applied as VB to one end of an N1 winding as a primary winding of a converter transformer T1. The minus (−) side of the rectified and smoothed output is shown by an "arrow in a circle" 100 in the diagram. The other end of the N1 winding is connected to a drain of a switching transistor [FET (field effect transistor) in the embodiment] Tr1. A resonance capacitor C1 is inserted between a terminal of the switching transistor Tr1 and the (31) side 100. The resonance capacitor C1 resonates with a peculiar inductance which equivalently exists in the N1 winding and converts a voltage waveform generated in the N1 winding to a sine waveform, thereby reducing a switching loss and efficiently transmitting an electric power to the secondary side of the transformer T1. A pulse signal for driving the switching transistor Tr1 is formed by a control circuit constructed by circuits 2 to 11, which will be explained hereinafter, and is supplied as an MPWM signal through a driver 1. In the case where the control circuit is arranged on the secondary side, the primary side of the transformer T1 is insulated from the control circuit in the driver 1. In each of secondary windings N2, N3, N4, N5, and the like of the transformer T1, a voltage waveform which is similar to the waveform of the voltage supplied to the N1 winding and corresponds to each turn ratio is generated by the switching operation of the transistor Tr1. As for a winding construction, for example, as shown in FIG. 1, a plurality of sets of wires are wound in accordance with the number of necessary outputs. In the invention, especially, an attention is paid to N2, N4, and N5.

N2 denotes the output winding. A power source output $V_O$ which was rectified and smoothed by a diode D1 and a capacitor C2 is produced from the winding N2. The power source output $V_O$ is divided by resistors R1 and R2 and is supplied as a voltage detection signal Vsns to an analog comparator 11 of the control circuit. The control circuit operates so as to set the power source output $V_O$ to be constant. The control circuit is power-on reset when the power source is turned on.

N5 denotes the detection winding. An output of the winding N5 is supplied as a timing sync signal SYNC to a pre-load terminal of a down counter 3 by a synchronous detecting circuit 4 as will be described hereinlater. When the signal is inputted to the pre-load terminal, the down counter 3 is forcedly reset to zero and generates a zero flag signal Z. The Z signal is connected to a load terminal of the down counter 3 through a load control circuit 10. An output of the load control circuit 10 is also supplied to an up/down control (U/D control) circuit 9.

N4 denotes the winding for supplying an electric power to a fluorescent lamp FL. The fluorescent lamp has a high impedance in a lit-off state. In order to start to light on the lamp, an alternating current of a relatively high voltage which is peculiar to the fluorescent lamp is needed. When starting the light-on, the impedance decreases, so that a voltage to be supplied to the fluorescent lamp when the lamp is lit on is low. In order to satisfy the condition, according to the embodiment, an output of the winding N4 is connected across the fluorescent lamp FL through a coil LFL. In order to control the on/off operations of the fluorescent lamp, an AC shunt switch constructed by a diode bridge circuit DB1 and a transistor SW. F is provided. Capacitors Cy1 and Cy2 are provided to adjust a current amount for preheating a filament of the fluorescent lamp when it is lit off.

The down counter 3 is a presettable counter to which a clock CLK of a frequency that is sufficiently higher than a frequency to drive the transformer T1 is supplied and which has a function to form the zero flag signal Z as mentioned above having a bit width such that necessary resolution and period can be obtained. Either one of outputs of up-down counters (U/D counters) A and B designated by reference numerals 7 and 8 in the diagram is selected by a selector 6 and is supplied to a digital set input terminal of the down counter 3. The input is counted down by the clock CLK.

A result obtained by comparing the foregoing voltage detection signal Vsns and a predetermined value $E_O$ which has previously been given by the analog comparator 11 is inputted to the U/D control circuit 9. The U/D control circuit 9 forms count up/down signals of the U/D counters 7 and 8 and a clock from the clock CLK, the above comparison result, and the output of the load control circuit 10.

A digital output H of the down counter 3 is compared with a preset digital value X by a digital comparator A designated by reference numeral 2. An output of the digital comparator 2 as a comparison result drives the transformer T1 through the driver 1 as an MPWM signal at a high/low level. The output of the counter 3 is also inputted to a digital comparator B designated by reference numeral 5 and is compared with a preset digital value W in order to decide a set value of the down counter 3. Either one of the U/D counters 7 and 8 is selected by the selector 6 by an output of the digital comparator 5 as a comparison result.

The operations of the foregoing control circuits 1 to 11 will now be shown in a timing chart of FIGS. 2A to 2E. In FIGS. 2A to 2E, an axis of abscissa in the diagram denotes a time; FIG. 2A schematically denotes the output value H of the down counter 3; FIG. 2B the output of the comparator 2, namely, the MPWM signal; FIG. 2C the output signal SYNC of the synchronous detecting circuit 4; and FIG. 2D the output signal of the analog comparator 11. A peak value at the leading edge of a saw tooth wave of FIG. 2A corresponds to the output of the U/D counter 7 or 8. Reference symbols X and W of FIG. 2A correspond to the set value X of the digital comparator 2 and the set value W of the digital comparator 5, respectively. Further, FIG. 2E indicates a drain voltage waveform of the switching transistor Tr1.

For a period (I) in FIGS. 2A to 2E, the power source output reaches a target set value, the control is in a stable state, pulse widths at a high level of the MPWM signals are almost equal, and the power source output $V_O$ of the output winding N2 is held to a predetermined value. A period (II) in FIGS. 2A to 2E shows the operation of a waveform at the time of the transient response.

The whole operation of the embodiment will be further described hereinbelow with reference to FIGS. 1 and 2A to 2E.

It is now assumed that when the transistor SW. F is in the ON state, the synchronous detecting circuit 4 operates and the SYNC signal is formed. The down counter 3 is reset to zero and the zero flag signal Z is outputted as mentioned above. By a signal from the load control circuit 10, thus, the down counter 3 loads an output of the U/D counter 7 which is selected by the selector 6. The digital comparator 2 further compares the output H of the down counter 3 and the set value X. When the output H is larger than the set value X, the comparator 2 generates the MPWM signal at the high level. Thus, the transistor Tr1 is turned on through the driver 1, the voltage VB is applied to the N1 winding of the transformer T1, and an exciting energy is accumulated to the N1 winding [at a timing (1) in FIGS. 2A to 2E].

Subsequently, the down counter 3 is counted down by the clock CLK. When the output H of the down counter 3 is smaller than the set value X, the comparator 2 inverts the signal and generates the MPWM signal at the low level [at a timing (2) in FIGS. 2A to 2E]. Thus, the transistor Tr1 is turned off through the driver 1, the exciting energy accumulated in the N1 winding of the transformer T1 is resonated at a frequency that is decided by the inductance L which equivalently exists in the transformer T1 and by the capacitor C1, so that a voltage of a sine waveform-like flyback waveform is generated. This voltage waveform is also generated in each of the secondary windings N2 to N5 of the transformer T1, the diode D1 is turned on, the capacitor C2 is charged, and the DC voltage $V_O$ is obtained.

The down counter 3 is further counted down by the clock CLK. When the synchronous detecting circuit 4 operates at a timing of a zero-cross shown in (3) in FIGS. 2A to 2E of the flyback waveform and the SYNC signal is generated, however, the output of the U/D counter 7 is again loaded through the selector 6.

The transformer T1 is driven by setting the above operations to one cycle. The U/D control circuit 9 allows the U/D counters 7 and 8 to operate as up counters for a period of time during which the value Vsns obtained by dividing the voltage of the output $V_O$ by the resistors R1 and R2 is lower than the target set value $E_O$. When the value Vsns exceeds the target set value $E_O$, the down counter 3 allows the U/D counters 7 and 8 to operate as down counters, thereby controlling data to be set to the down counter 3. Thus, for a period of time during which the output H of the down counter 3 exceeds the set value X to be compared by the comparator 2, the ON period of the transistor Tr1 is controlled. The U/D control circuit 9 drives the U/D counters 7 and 8 by adjusting a timing in consideration of response characteristics of the whole power source or a matching with the operation of a circuit which is connected at the post stage. As mentioned above, the output $V_O$ is controlled to a predetermined value by increasing or decreasing a digital set value which is loaded to the down counter 3.

The inductance which equivalently exists on the primary side of the transformer T1 when the transistor SW. F is in the ON state is equivalent to a construction in which an inductance L1 of the N1 winding and the coil LFL are connected in parallel. In this state, the resonance frequency of the flyback waveform is determined by L1//LFL (parallel inductance between L1 and LFL) and C1.

For a period of time until the transistor SW. F is turned off and the fluorescent lamp FL is started to be lit on, however, the impedance of the fluorescent lamp FL is high, so that the coil LFL is not seen from the primary side and the resonance frequency in this case is decided by L1 and C1. When the transistor SW. F is turned off, therefore, as shown in (4) in FIG. 2E, the frequency of the flyback waveform decreases and the peak value is reduced. In this state, since the peak value which is generated in each winding is reduced, the output $V_O$ decreases. The ON period of the switching transistor Tr1 is gradually extended by the foregoing U/D control and the peak value is recovered. However, its period is relatively long.

By the comparison by the comparator 5, when the output value H of the down counter 3 is lower than the set value W (W<V), the selector 6 selects the output of the U/D counter 8 by the output of the comparator 5. A predetermined value (it is assumed to μ) has been preset to the U/D counter 8. The U/D counter 8 is counted up or down by using the predetermined value as a reference and its count value is always larger than that of the U/D counter 7 by only the value of α. Since the transformer T1 is driven by the data loaded in the down counter 3 at a timing shown in (6) in FIGS. 2A to 2E, the peak value is immediately recovered to the original value at a timing shown in (7) in FIG. 2E. In the case where the fluorescent lamp FL is lit on and is set to the low impedance or the transistor SW. F is turned on, the operations opposite to the above operations are performed.

As a control circuit having the same functions as those of the control circuit comprising the circuits 2 to 11 mentioned above, the functions of the circuits 2 to 10 are realized as a digital circuit such as CPU, ROM, RAM, etc. and the comparator 11 is realized as an analog circuit such as a D/A converter or the like, and those circuits are formed on the same chip. Thus, the set values can be set by the CPU. With the above construction, the optimum value can be set by a software in accordance with various kinds of conditions.

As described above, the power supply apparatus in which even if the resonance frequency extremely changes by the inductance load, the apparatus can be controlled so as to follow such a change at a high response speed can be realized.

The present invention is not limited to the foregoing embodiment but many modifications and variations are possible within the spirit and scope of the appended claims of the invention.

What is claimed is:

1. A power supply apparatus comprising:

a first comparator for comparing a detection value to detect a rectification output of a first predetermined winding of a transformer and a predetermined value;

first and second up/down counters in which counting up/down operations are switched by an output of said first comparator;

a selector for selecting outputs of said first and second up/down counters;

a sync circuit for generating a sync pulse at: a predetermined timing in accordance with an output of a second predetermined winding of said transformer;

a down counter for loading the output of said up/down counter selected by said selector at a generating timing of said sync pulse;

second and third comparators for comparing an output of said down counter and different predetermined digital values; and a driving circuit for deciding a conduction timing of a switching device of a driving winding on the primary side of said transformer in accordance with an output of said second comparator, wherein said selector selects either one of said first and second up/down counters in accordance with an output of said third comparator.

2. A power supply apparatus comprising:

a transformer;

a first comparator for comparing an output of first secondary winding of said transformer with a predetermined value;

an up/down counter in which an up count operation and a down count operation are changed in response to an output of said comparator;

a sync circuit for generating a sync pulse at a predetermined timing in accordance with an output of a second winding of said transformer;

a down counter for loading the output of said up/down counter at a generating timing of said sync pulse;

second and third comparators for comparing an output of said down counter and different predetermined digital values;

a driving circuit for deciding a conduction timing of a switching device of a driving winding on the primary side of said transformer in accordance with an output of said second comparator; and initial value changing means for increasing a value load to said down counter from said up/down counter according to an output of said third comparator.

3. An apparatus according to claim 2, wherein said up/down counters, said sync circuit, said down counter, said second and third comparators and said initial value changing means are realized as a digital circuit such as CPU, ROM, RAM, etc. and said first comparator is realized as an analog circuit such as a D/A converter or the like, and both of said digital and analog circuit are formed on a same chip.

4. An apparatus according to claim 2, wherein said power supply apparatus supplies a power to an impedance load connected to a secondary side of said transformer.

5. An apparatus according to claim 4, wherein said impedance load is a fluorescent lamp.

6. A power supply apparatus comprising:

a transformer;

a driving circuit for driving a primary side of said transformer;

first comparator for comparing an output of a secondary side of said transformer with a first predetermined value;

setting means for setting a count initial value according to an output of said first comparator;

a down counter for loading the count initial value set by said setting means and a down counting from the loaded count initial value;

a second comparator for comparing an output of said down counter with a second predetermined value and outputting a PWM signal which is pulse width modulated to operate said driving circuit;

a third comparator for outputting to said setting means, an instruction for making a count initial value higher than a normal count initial value according to a comparison result obtained by comparing the output of said down counter with a third predetermined value, wherein said setting means increases a count initial value for a predetermined value in comparison with the normal count initial value according to an input of the instruction of said third comparator.

* * * * *

UNITED STATES PATENT AND TRADEMARK OFFICE
CERTIFICATE OF CORRECTION

PATENT NO. : 5,748,460

DATED : May 5, 1998

INVENTOR : Tadashi Ishikawa

It is certified that error appears in the above-identified patent and that said Letters Patent is hereby corrected as shown below:

COLUMN 1

Line 63, "(31)" should read --(-)--.

COLUMN 4

Line 48, "to μ)" should read --to a)--.

COLUMN 5

Line 21, "at:" should read --at--.

COLUMN 6

Line 17, "circuit" should read --circuits--;
Line 27, "first" should read --a first--; and
Line 39, "circuit;" should read --circuit; and--.

Signed and Sealed this

Twelfth Day of January, 1999

Attest:

Attesting Officer

*Acting Commissioner of Patents and Trademarks*